(12) United States Patent
Rhee et al.

(10) Patent No.: US 8,920,913 B2
(45) Date of Patent: Dec. 30, 2014

(54) POROUS MULTI-LAYER FILM WITH IMPROVED THERMAL PROPERTIES

(75) Inventors: Jang Weon Rhee, Daejeon (KR); Gwi Gwon Kang, Daejeon (KR); In Hwa Jung, Cheonan-si (KR); Young Keun Lee, Seoul (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 13/574,813

(22) PCT Filed: Jan. 25, 2011

(86) PCT No.: PCT/KR2011/000505
§ 371 (c)(1),
(2), (4) Date: Jul. 24, 2012

(87) PCT Pub. No.: WO2011/090356
PCT Pub. Date: Jul. 28, 2011

(65) Prior Publication Data
US 2012/0301698 A1    Nov. 29, 2012

(30) Foreign Application Priority Data
Jan. 25, 2010 (KE) .................. 10-2010-0006447

(51) Int. Cl.
| | | |
|---|---|---|
| *B32B 7/02* | (2006.01) | |
| *H01M 2/16* | (2006.01) | |
| *B32B 27/08* | (2006.01) | |
| *B32B 27/30* | (2006.01) | |
| *B32B 27/32* | (2006.01) | |
| *B32B 3/26* | (2006.01) | |
| *H01M 10/052* | (2010.01) | |

(52) U.S. Cl.
CPC ............ *H01M 2/162* (2013.01); *B32B 7/02* (2013.01); *B32B 27/08* (2013.01); *B32B 27/304* (2013.01); *B32B 27/32* (2013.01); *H01M 2/1613* (2013.01); *H01M 2/1686* (2013.01); *B32B 3/266* (2013.01); *B32B 2250/24* (2013.01); *B32B 2270/00* (2013.01); *B32B 2307/306* (2013.01); *B32B 2457/10* (2013.01); *H01M 10/052* (2013.01); *B32B 2307/20* (2013.01)

USPC .......................................... 428/212; 428/220

(58) Field of Classification Search
CPC ........ B32B 3/266; B32B 7/02; B32B 27/304; B32B 27/32; B01M 2/1613
USPC ................................................... 428/212, 220
See application file for complete search history.

(56) References Cited

U.S. PATENT DOCUMENTS

| | | |
|---|---|---|
| 5,691,077 A | 11/1997 | Yu |
| 6,566,012 B1 | 5/2003 | Takita et al. |
| 6,949,315 B1 | 9/2005 | Samii et al. |
| 2006/0055075 A1 | 3/2006 | Hoshida et al. |
| 2008/0057388 A1 | 3/2008 | Kono et al. |
| 2010/0003591 A1 | 1/2010 | Takita et al. |
| 2010/0129720 A1 | 5/2010 | Sako et al. |

FOREIGN PATENT DOCUMENTS

| | | |
|---|---|---|
| EP | 2075126 A1 | 7/2009 |
| JP | 2002321323 A | 11/2002 |
| JP | 2010502471 A | 1/2010 |
| KR | 1020090035724 A | 4/2009 |
| KR | 1020090071296 A | 7/2009 |
| KR | 1020090077812 A | 7/2009 |
| WO | 0049074 A1 | 8/2000 |
| WO | 2009148239 A2 | 12/2009 |
| WO | 2010117166 A2 | 10/2010 |

*Primary Examiner* — Aaron Austin
*Assistant Examiner* — Lawrence Ferguson
(74) *Attorney, Agent, or Firm* — The Webb Law Firm

(57) ABSTRACT

Provided is a porous multi-layer film having two or more layers that is used as a separator for battery. In the film, more than 2 layers have different porosities and pore sizes. The film has a thickness of 9 to 50 μm, a machine direction (MD) loop stiffness of 0.008 mg/μm or more, puncture strength of 0.15 N/μm or more, permeability of $1.5 \times 10^{-5}$ Darcy or more, shutdown temperature of 140° C. or less, melt-down temperature of 170° C. or more, a transverse direction (TD) maximum shrinkage of 25% or less in Thermomechanical Analysis (TMA) under a load of 1 mN/(1 μm×6 mm), and melt down temperature of 160° C. or more. Since the porous multi-layer film shows excellent thermal stability at high temperature and electrolyte retaining property due to a dual pore structure, the film shows a superior effect when used as a separator for high-capacity/high-power lithium ion battery.

8 Claims, 1 Drawing Sheet

POROUS MULTI-LAYER FILM WITH IMPROVED THERMAL PROPERTIES

TECHNICAL FIELD

The present invention relates to a porous multi-layer film with improved thermal properties, more particularly, to a porous multi-layer film having excellent thermal stability, electrolyte retaining property and battery assembling stability when used as a separator for a lithium secondary battery since the film is formed of two or more layers, and has micro pores, low shut-down temperature and high melt-down temperature properties.

BACKGROUND ART

Although a lithium ion secondary battery is an excellent battery having a very high energy density, it has danger of explosion when a short is generated, such that a separator used therein is greatly requested to have quality stability together with a high quality level. In accordance with the recent trend of high-capacity and high-power of the lithium ion secondary battery such as a battery for a hybrid vehicle, etc., there has been a greater demand for a thermal stability of the separator, in addition to the quality stability of the conventional product. This is the reason that if thermal stability of the separator is deteriorated, the danger of explosion by the melt-down of the separator due to overheat of the battery is increased.

The efforts to improve thermal stability of the separator have been tried broadly in three ways. There are a method to increase thermal properties by adding inorganic materials or resin having thermal resistance to the conventional polyethylene, a method to coat material having thermal resistance on a surface, and a method to prepare a multi-layer separator including a layer having thermal resistance.

U.S. Pat. No. 6,949,315 discloses a film that improves thermal stability of a separator by mixing 5 to 15 wt % inorganic materials such as titanium oxide to ultra-high molecular weight polyethylene. However, the method suggested in the above-mentioned patent has an effect in slightly improving thermal stability by adding the inorganic materials but thermal stability is not improved to the level higher than a melting point of polyethylene since the matrix of the separator is polyethylene. Also, this method may easily cause problems such as deterioration of mixing performance due to adding of the inorganic materials, generation of pin-holes, and non-uniform of the quality due to the deteriorated mixing performance when being stretched. Also, the method may cause deterioration in the physical property of the film such as impact strength due to lack of compatibility of interface between the inorganic materials and polymer resin.

A separator that is prepared by mixing a resin having excellent thermal resistance instead of inorganic materials is disclosed in U.S. Pat. No. 5,641,565. This technique is to mix 30 to 75 wt % organic liquid and 10 to 50 wt % inorganic materials with a resin mixture where polyethylene is mixed with 5 to 45 wt % polypropylene and then to extract the organic liquid and the inorganic materials, thereby preparing a separator. This technique has a limitation in improving thermal stability since the matrix of the separator is polyethylene. Also, the physical property is deteriorated due to the addition of polypropylene that does not mix with polyethylene as mentioned in the patent itself. This method needs a relatively high amount of polypropylene in order to obtain a sufficient thermal stability, wherein the physical property of the separator is more deteriorated.

A method to coat material having thermal stability on a surface of a microporous film is disclosed in U.S. Patent Publication No. 2006-0055075. However, since the coating method has a limit in increasing the permeability of a coating layer, the permeability of the entire film is highly likely to be decreased and the non-uniform quality is highly likely to be generated due to the deterioration in a wetting property between the coating layer and the microporous film.

The method to prepare a multi-layer separator for improving thermal stability of a separator is to use lamination. U.S. Pat. No. 5,691,077 discloses a method of making a 3 layer separator by laminating a polypropylene layer having a high melt-down temperature (having a high melting temperature) on polyethylene having an excellent shut-down property (having a low melting temperature). Although this separator prepared by a dry process (a method for forming micro pores by causing micro crack between lamellas as a crystalline part of polyolefin through stretching at low temperature after preparing a thick polyolefin sheet) is excellent in view of thermal properties, it has not only a deterioration problem in productivity due to the addition of the lamination process performed in a separated process but also a delamination problem due to the defect of the lamination, in addition to the disadvantages of the stretching non-uniformity, the generation of pin-holes, and the increase of thickness deviation, etc. in a preparation process of a fabric film by a dry process, such that this separator has not been widely used. Also, since the separator prepared by the dry process has a small pore size, it is difficult to provide sufficient permeability.

Japanese Patent Laid-Open No. 2002-321323 discloses a polyolefin microporous film that polyethylene layer and polyethylene/polypropylene mixed layer are laminated and unified. However, the polypropylene content of the layer made from polyethylene/polypropylene mixture is so low, that it is difficult to expect sufficient increase of the melt-down temperature.

A separator for a secondary battery essentially requires an electrolyte retaining property and a battery assembling stability in addition to strength, permeability, quality uniformity, and thermal stability. However, the above-mentioned prior arts do not have the properties at the same time.

DISCLOSURE OF INVENTION

Technical Problem

An object of the present invention is to provide a porous multi-layer film having a thickness of 9 to 50 µm, loop stiffness to the machine direction (MD) of 0.008 mg/µm or more, puncture strength of 0.15 N/µm or more, permeability of $1.5 \times 10^{-5}$ Darcy or more, shut-down temperature of 140° C. or less, melt fracture temperature of 170° C. or more, the maximum shrinkage to the transverse direction (TD) of 25% or less in TMA under the load of 1 mN/(1 µm×6 mm), melt down temperature (a temperature that the length reaches 120%) to the transverse direction (TD) of 160° C. or more in TMA under the load of 1 mN/(1 µm×6 mm).

To be specific, the object of the present invention is to provide a porous multi-layer film having excellent electrolyte retaining properties and battery assembling stability in addition to excellent strength, permeability, quality uniformity and thermal stability when it is used in a secondary battery.

Solution to Problem

To achieve the above objects, the present invention provides a porous multi-layer film having excellent thermal stability at high temperature and electrolyte retaining property induced from the dual pore structure.

The present invention will be described in detail hereinafter.

Unless defined otherwise, all terms used herein have the same meaning as commonly understood by one of ordinary skill in the art. A detailed description on the known function and configuration that may blur the point of the present invention, is omitted in the following description and accompanying drawings.

Provided is a porous multi-layer film with improved thermal properties, more particularly, is a porous multi-layer film including a first layer having porosity of 30 to 60% and an average pore diameter of 0.01 to 0.1 µm, and a second layer that has a porosity of 50 to 80%, and is adjacent to the first layer. An area ratio that pores having an average plane diameter of 0.1 to 50 µm occupy in the pores of the second layer is 70% or more. A thickness of the second layer is 3 µm or more and the thickness ratio of second layer to the entire porous multi-layer film is 30 to 70%.

The porous multi-layer film will be described in detail hereinafter.

The first layer included in the porous multi-layer film may have a porosity of 30 to 60%, preferably 40 to 55%. When the porosity of the first layer is below 30%, the porous multi-layer film is not proper to be used as a separator for battery due to the low permeability of the porous film. When the porosity of the first layer exceeds 60%, high permeability may be obtained but the strength of the porous film is deteriorated.

The first layer is a layer for improving quality stability of the separator based on micro pores and an average diameter of the pore may be 0.01 to 0.1 µm, preferably 0.01 to 0.08 µm, more preferably 0.01 to 0.05 µm. When the average diameter is below 0.01 µm, it is not proper to be used as a separator for battery due to insufficient permeability. When the average diameter exceeds 0.1 µm, the quality stability of the porous film is deteriorated due to the large size of the pore.

The second layer, which is included in the porous multi-layer film and is adjacent to the first layer, is a layer improving the permeability and electrolyte retaining properties of the separator based on the high porosity and the large pore. The second layer may have the porosity of 50 to 80%, preferably 60 to 80%. When the porosity of the second layer is below 50%, capacity and efficiency of the battery is reduced due to the low permeability of the porous film, thereby deteriorating the electrolyte retaining properties. When the porosity of the second layer exceeds 80%, the second layer is not proper to be used as a separator for battery since the strength of the porous film is decreased in spite of the high permeability and the excellent electrolyte retaining properties.

In the second layer, an area ratio that pores having an average plane diameter of 0.1 to 50 µm occupy among the pores of the second layer is 70% or more, preferably 70 to 90%. When the average plane diameter of the pore is below 0.1 µm, there is a problem in that the permeability of the porous film is deteriorated. When the average diameter exceeds 50 µm, the strength of the porous film is decreased and the stability of the battery is deteriorated.

When the area ratio that pores having an average plane diameter of 0.1 to 50 µm, preferably 1 to 50 µm, occupy among the pores of the second layer is below 70%, the permeability and electrolyte retaining properties are not sufficiently improved.

The thickness of the second layer may be 3 µm or more, preferably 3 to 15 µm, and the thickness ratio of the second layer to the entire porous multi-layer film may be 30 to 70%. When the thickness of the second layer is below 3 µm or when the thickness ratio of the second layer to the entire porous multi-layer film is below 30%, the effect of the large pore and the high porosity of the second layer is not acquired and the thermal stability is not largely improved. When the thickness ratio of the second layer exceeds 70% of that of the entire porous multi-layer film, the strength and the quality stability of the porous film are deteriorated.

The thickness of the porous multi-layer film may be 9 to 50 µm, preferably 12 to 35 µm. When the thickness of the porous multi-layer film is below 9 µm, the strength of the film is decreased. When the thickness of the porous multi-layer film exceeds 50 µm, the permeability of the entire porous film is deteriorated to decrease the capacity and efficiency of the battery.

The loop stiffness to the machine direction (MD) of the porous multi-layer film may be 0.008 mg/µm or more, preferably 0.008 to 0.030 mg/µm. When the loop stiffness is below 0.008 mg/µm, the assembling stability of the battery is deteriorated.

The puncture strength of the porous multi-layer film may be 0.15 N/µm or more, preferably 0.2 to 0.5 N/µm. When the puncture strength is below 0.15 N/µm, it is not proper to be used as a separator for battery due to low strength.

The gas permeability of the porous multi-layer film may be $1.5 \times 10^{-5}$ Darcy or more, preferably $2.0 \times 10^{-5}$ to $10 \times 10^{-5}$ Darcy. When the gas permeability is below $1.5 \times 10^{-5}$ Darcy, it is not proper to be used as the high-capacity/highly efficient battery.

The thermal stability of the separator in the battery is determined by shut-down temperature and melt fracture temperature. The shut-down temperature is temperature at which no more current flow as micropores of batteries are closed when the internal temperature of battery is abnormally increased. The melt fracture temperature is temperature at which current flows again as separators are melted down when the temperature of batteries is increased continuously to much higher temperature than the shut-down temperature. For the stability of the battery, it is preferable that the shut-down temperature is low and the melt fracture temperature is high. In particular, the melt fracture temperature, which is temperature that can continuously block current in a situation where the explosion of the battery may be caused, has the closest relation with the stability of the battery.

The microporous multi-layer film may have shut-down temperature of 140° C. or less, preferably 130 to 140° C., and melt-down temperature of 170° C. or more, preferably 180° C. or more, more preferably 180 to 300° C. When the shut-down temperature exceeds 140° C. or when the melt-down temperature is below 170° C., the thermal stability of the battery is largely deteriorated.

Thermomechanical Analysis (TMA) is a device for measuring the degree of deformation (contraction or extension) of a film while increasing temperature under a predetermined load. The maximum shrinkage in TMA shows a level that a film is contracted by heat under a predetermined load. Melt down temperature in TMA is temperature at which a length of a separator becomes 120% compared with an initial length when temperature of a separator increases under a predetermined load. When the maximum shrinkage is high, an electrode is exposed by contraction of the separator at high temperature to cause the generation of a short. When the melt down temperature is low, the separator is fractured at high temperature to cause the generation of a short. When the maximum shrinkage in TMA is lower and the melt down temperature in TMA is higher, the separator has more excellent stability at high temperature. The separator has the maximum shrinkage to the transverse direction (TD) of 25% or less in TMA under the load of 1 mN/(1 μm×6 mm), preferably 0 to 25%, and melt down temperature (temperature at which its length becomes 120%) of 160° C. or more, preferably 160 to 300° C. The transverse direction (TD) is vertical to the direction that the separator is wound around the battery. The fewer the deformation of the separator in transverse direction (TD) causing a short between electrodes is, the better. When the maximum shrinkage to the transverse direction (TD) in TMA exceeds 25%, or when melt down temperature is below 160° C., the stability of the separator at high temperature is decreased to cause the deterioration in the stability of the battery.

A method for preparing the porous multi-layer film will be described. The method for preparation of the separator includes:

(a) melting and mixing a composition for preparing a first layer;

(b) melting and mixing a composition for preparing a second layer;

(c) fabricating the composition mixed in the steps (a) and (b) to be a multi-layer sheet;

(d) stretching the multi-layer sheet to be a film;

(e) extracting a diluent from the film;

(f) secondary-stretching the film;

(g) heat-setting the secondary-stretched film.

Hereinafter, the respective steps will be described in more detail.

The step (a) melting and mixing a composition for preparing a first layer; is performed.

A resin used in the first layer may be homopolyethylene formed of ethylene only or a combination of ethylene and α-olefin comonomers having 3 to 8 carbon atoms, or those polyethylene mixture. The polyethylene mixture is a mixture of polyethylenes formed of ethylene only or a combination of ethylenes and α-olefin comonomers having 3 to 8 carbon atoms. The melting temperature of the final mixture is 125 to 140° C.

Since the first layer decreases the shut-down temperature of the microporous film based on a small average diameter of a pore, the melting temperature of polyethylene and the polyethylene mixture may be 125 to 140° C. When the melting temperature is below 125° C., it is difficult to form a pore due to low crystallinity. When the melting temperature exceeds 140° C., the shut-down temperature of the porous film increases.

A molecular weight of the polyethylene and polyethylene mixture has a weight average molecular weight of $2\times10^5$ to $3\times10^6$, more preferably $2\times10^5$ to $1.5\times10^6$. When the weight average molecular weight is below $2\times10^5$, the physical property of the porous film is deteriorated. When the weight average molecular weight exceeds $3\times10^6$, the extrusion melt-mixing property is deteriorated to cause the reduction of productivity.

The polyethylene and polyethylene mixture are mixed with diluents inside an extruder. Organic liquids that are thermally stable at extrusion temperature such as aliphatic or cyclic hydrocarbon including nonane, decane, decalin, and paraffin oil and phthalic acid ester including dibutyl phthalate and dioctyl phthalate may be used as diluents. Paraffin oil that is harmless to humans, has a high boiling point and few volatile elements is preferable. Paraffin oil having kinetic viscosity of 20 to 200 cSt at 40° C. is more preferable. When the kinetic viscosity of paraffin oil is below 20 cSt, there is a difficulty in mixing in an extrusion process due to a viscosity difference between paraffin oil and melt polyethylene inside the extruder. When the kinetic viscosity of paraffin oil exceeds 200 cSt, problems such as surface defect of sheets and films and extruding load increase due to high kinetic viscosity in the extrusion process may occur. In addition, there is a difficulty in extraction in an extraction process to cause the reduction of productivity and permeability due to oil residue after extraction.

A composition of polyethylene of 20 to 50 wt % and diluents of 50 to 80 wt % may be used. When a content of polyethylene is below 20 wt %, i.e., when diluents exceeds 80 wt %, the mixing performance of polyethylene and diluents is deteriorated. Accordingly, polyethylene is not thermodynamically mixed to diluents and is extruded in a gel form thereby causing problems of non-uniform thickness and fracture when being stretched. When the content of polyethylene exceeds 50 wt %, i.e., when diluents below 50 wt %, porosity and a pore size is reduced. Also, permeability is noticeably deteriorated due to a few interconnections among pores.

If necessary, some additives for particular purposes, such as antioxidant, UV stabilizer, antistatic agent, and organic/inorganic nucleating agent may be added to the composition.

The composition is melt and mixed using a banbury mixer, a melt-mixer or a twin-screw compounder designed for melting and mixing diluents and polyethylene. The mixing temperature may be 180 to 300° C. Polyethylene and diluents are blended to be introduced to a compounder. Otherwise, each of them may be introduced from a separated feeder.

The step (b) melting and mixing a composition for preparing a second layer; is performed.

The composition for preparing the second layer is formed of a resin composition alone or with inorganic materials, if necessary. The melt-down temperature of the porous multi-layer film may become 170° C. or more through two kinds of systems.

A resin composition described in a first aspect includes a high heat-resistant resin and other resins that are liquid-liquid phase separated from the high heat-resistant resin. A resin composition described in a second aspect includes a general heat-resistant resin and other resins that are liquid-liquid phase separated from the general heat-resistant resin.

The two resin systems will be described in detail.

As the first aspect, (1) when a high heat-resistant resin having a melting temperature of 180° C. or more, preferably melting temperature of 180 to 300° C., was used, a content of the high heat-resistant resin is 50 volume % or more, preferably 50 to 85 volume % in the resin composition. A content of other resins performing a function of the pore former is 15 volume % to 50 volume % of the resin composition. The content of the high heat-resistant resin may be 50 volume % or more of the resin composition. It is because when the content of the high heat-resistant resin is 50 volume % or more of the resin composition, a matrix of the high heat-resistant resin is formed inside the separator and the melt-down temperature becomes 170° C. or more. When the resin content of the high heat-resistant resin exceeds 85 volume % of resin composition, pores may not be sufficiently formed in a stretching process. Examples of the high heat-resistant resin include polymethylpentene, polyethylene terephthalate, polycarbonate, polyester, polyvinylalcohol, polyacrylonitrile, polymethyleneoxide, polyamide or a mixture thereof but are not limited thereto.

A principle of forming a pore in the second layer is to broaden the interface between the high heat-resistant resin and other resins in the stretching process inside the high heat-resistant resin matrix. Other resins include resins to be liquid-liquid phase separated from the high heat-resistant resins (hereinafter called 'other resins').

Examples of the resins to be liquid-liquid phase separated from the high heat-resistant resins include polyethylene, polypropylene, polyethylenevinylacetate, polystylene, polyvinylchloride, polyvinyllidene fluoride, polymethylpentene, polyethylene terephthalate, polycarbonate, polyester, polyvinylalcohol, polyacrylonitrile, polymethyleneoxide, polyamide or a mixture thereof. When the most preferable polyethylene is used, there is an effect that an adhesion with the first layer is improved.

An inorganic material of 50 wt % or less may be additionally used in the resin composition. When the inorganic material is additionally used, thermal properties may be improved. However, when the content of the inorganic material exceeds 50 wt %, the pore may be torn in the process of stretching to cause the deterioration of the physical property.

The inorganic materials may be inorganic materials having an average particle size of 0.01 to 5 μm selected from the group consisting of silicon dioxide ($SiO_2$), aluminum oxide ($Al_2O_3$), calcium carbonate ($CaCO_3$), titanium dioxide ($TiO_2$), $SiS_2$, $SiPO_4$, MgO, ZnO, $BaTiO_3$, natural clay, organically modified clay and a mixture thereof, or a mixture thereof. When the average particle size is below 0.01 μm, the pore formed in the stretching process is not proper to the porous film due to its small size. When the average particle size exceeds 5 μm, the size of the pore formed after stretch is too large and it causes the deterioration of the physical property of the porous film. When the inorganic materials except the other resins to be liquid-liquid phase separated from the high heat-resistant resins is further used as other compositions, thermal stability may be improved.

As the second aspect, (2) when a general heat-resistant resin having a melting temperature of 160 to 180° C. is used, it is required that the general heat-resistant resin content of the second layer is 50 volume % or more of the resin composition and the content of the inorganic material is 30 to 60 wt % at the same time. It is because even if the content of the general heat-resistant resin is 50 volume % of the resin composition, it is difficult to have a melt-down temperature of 170° C. or more. In this case, the melt-down temperature increases by the improvement of thermal stability due to the addition of the inorganic materials. When the content of the inorganic material becomes 30 wt % or more, the melt-down temperature becomes 170° C. or more. When the content of the inorganic material exceeds 60 wt %, the film uniformity is deteriorated due to defect in the mixing of the inorganic materials. When the pore is torn in the secondary-stretching process, pin-holes may be generated.

Examples of the general heat-resistant resin include polypropylene or a polypropylene mixture, but are not limited thereto.

The polypropylene is polypropylene alone or a polypropylene mixture having a melting temperature 160 to 180° C. formed of propylene alone or a combination of propylene, ethylene and α-olefin having 4 to 8 carbon atoms. Also, the polypropylene mixture is propylene alone or a mixture of polypropylenes formed of combinations of propylene, ethylene and α-olefin having 4 to 8 carbon atoms. The weight average molecular weight of polypropylene may be $5 \times 10^4$ to $2 \times 10^6$. When the weight average molecular weight is below 50,000, excellent mixing performance with the inorganic materials is obtained but the physical property of the porous film is deteriorated. When the weight average molecular weight exceeds $2 \times 10^6$, there may be a problem in the mixing performance with the inorganic material.

50 volume % or less of other resins to be liquid-liquid phase separated from the general heat-resistant resin may be used in the resin composition of the second aspect. Examples of other resins include polyethylene, polyethylenevinylacetate, polystylene, polyvinylchloride, polyvinyllidene fluoride, polymethylpentene, polyethylene terephthalate, polycarbonate, polyester, polyvinylalcohol, polyacrylonitrile, polymethyleneoxide, polyamide or a mixture thereof but are not limited thereto.

The inorganic materials used with the general heat-resistant resin may be inorganic materials having an average particle size of 0.01 to 5 μm selected from the group consisting of silicon dioxide ($SiO_2$), aluminum oxide ($Al_2O_3$), calcium carbonate ($CaCO_3$), titanium dioxide ($TiO_2$), $SiS_2$, $SiPO_4$, MgO, ZnO, $BaTiO_3$, natural clay, organically modified clay and a mixture thereof, or a mixture thereof.

If necessary, general additives for improving a specific function such as antioxidant, UV stabilizer, antistatic agent, and organic/inorganic nucleating agent may be further added. melting and mixing is performed using a twin-screw compounder, a melt-mixer or a banbury mixer designed for mixing polymer and inorganic materials. The melt-mixing temperature may be 180 to 300° C.

The step (c) of fabricating the composition melt-mixed in the steps (a) and (b) to be a multi-layer sheet; is performed.

A general casting method or a calendering method may be used as a method for fabricating multi-layer sheet from the melt. A co-extruding method, a thermal bonding method or a coating method may be used as a method for forming a multi-layer sheet. The co-extrusion method is a method for forming a multi-layer sheet by co-extruding melts extruded from each extruder when forming the sheet through a T-die with multi layers, and the thermal bonding method is a method to overlap sheets obtained from each extruder and to thermally bond them, while applying pressure thereto. The coating method is a method for forming a multi-layer sheet by secondarily extruding another layer on a primarily formed sheet.

The porous multi-layer film includes a two-layer porous film formed of a first layer and a second layer, a three-layer porous film where first layers are formed on both surfaces of a second layer, and a three-layer porous film where second layers are formed on both surfaces of a first layer.

The step (d) of fabricating a film by stretching the multi-layer sheet; is performed.

The stretching may use any stretching methods, such as a tenter type simultaneous stretching or a sequential stretching that performs a stretching in a machine direction using a roll and performs a secondary stretching in a transverse direction using a tenter, etc.

Stretching ratios are 5 times or more in a machine direction (MD) and 3 times or more in a transverse direction (TD). A ratio between the machine direction (MD) and transverse direction (TD) stretching ratios is 1.2 or more. A total stretching ratio may be 25 to 60 times. When the machine direction (MD) stretching ratio is below 5 times, the loop stiffness to the machine direction (MD) is weakened to cause the deterioration of the battery assembling stability. When the ratio between the machine direction (MD) and transverse direction (TD) stretching ratios is below 1.2, the maximum shrinkage in TMA of the transverse direction (TD) is noticeably increased. When the transverse direction (TD) stretching ratio is below 3 times, non-stretching may occur and the physical property may be deteriorated due to insufficient stretching. The transverse direction (TD) stretching ratio may be 3 times to 7 times. When the transverse direction (TD) stretching ratio exceeds 7 times, the maximum contract in TMA is remarkably increased.

The stretching temperature varies depending on the concentration and a type of diluents and a melting point of resins used in the first layer. An optimal stretching temperature may be selected in a temperature range that 30 to 80 wt % of a resin crystal portion in a first layer sheet is melted. When the stretching temperature is selected in a range of temperatures lower than the melting temperature where 30 wt % of the resin crystal portion in the first layer sheet melt, the film does not have softness so that the stretchability becomes bad, thereby having a high possibility that a fracture occurs at the time of stretching simultaneously with causing a local non-stretching. On the other hand, when the stretching temperature is selected in a range of temperatures higher than the temperature where 80 wt % of the resin crystal portion in the first layer sheet fabricating is melted, a thickness deviation occurs due to partial over-stretching and orientation is not sufficient, thereby noticeably deteriorating the physical property.

The stretching temperature range is remarkably lower than the melting temperature of the high heat-resistant or general heat-resistant resin used in the second layer. Through this stretching, the interface of inorganic materials, high heat-resistant or general heat-resistant resins and other resins of the second layer is cracked to generate pores.

The extent that the crystal portion is melted depending on the temperature may be obtained from a differential scanning calorimeter (DSC) analysis of a sheet.

The step (e) of extracting diluents from the film; is performed.

The sheet which becomes thin through the stretching process, that is, the film, is dried after being extracted using organic solvent. Organic solvents used in the present invention are not specifically limited but any solvent that extracts diluent used in extruding resin, preferably, methyl ethyl ketone, methylene chloride, and hexane, etc. that have a high extraction efficiency and dries rapidly. The extraction method may use all general solvent extraction methods such as an immersion method, a solvent spray method, and ultrasonic method, respectively or in combination thereof. When extracted, the content of remaining diluent should be 1 wt % or less. When the content of remaining diluent is above 1 wt %, the physical property is deteriorated and the permeability of the film is reduced.

The amount of remaining diluent is greatly influenced depending on extraction temperature and extraction time. The extraction temperature is preferably high in order to increase solubility of diluent and solvent, but the extraction temperature of 40° C. or lower may be more preferably in consideration of a safety problem by means of boiling of the solvent. When the extraction temperature is lower than a freezing temperature of solvent, the extraction efficiency is noticeably deteriorated. Accordingly, the extraction temperature should be higher than the freezing point of solvent. The extraction time varies depending on the film thickness, but may be 2 to 4 minutes when manufacturing a microporous film having a thickness of 7 to 40 µm.

The step of (f) secondary-stretching the film; is performed.

The dried film is secondary-stretched. Partial non-uniformity occurs in the film in the process that the diluents are extracted and dried. The secondary-stretching improves quality uniformity of the film, permeability and strength. The secondary-stretching may be within the range of 1.3 times to 2 times with no regard to its direction (MD or TD). When stretching magnification is below 1.3 times, the improvement of quality uniformity is low. When the stretching ratio exceeds 2 times, the shrinkage of the film becomes too large.

The secondary-stretching temperature may be selected in a range of the temperature that 30 to 80 wt % of the crystal portion of the first layer dried after extraction is melted. When the secondary-stretching temperature is lower than the temperature that 30 wt % of the crystal portion of the first layer is melted, fracture occurs when being stretched and the shrinkage of the film largely increases. On the other hand, when the secondary-stretching temperature exceeds the temperature that 80 wt % of the first layer crystal portion is melted, thickness deviation occurs due to partial over-stretching and uniformity is not sufficiently improved.

The step of (g) heat-setting a secondary-stretched film; is performed.

The heat-setting is performed in order to reduce the shrinkage of a film by finally removing remaining tension. In the step of heat-setting, 20 to 35% of the film is contracted after secondary-stretching the film in a direction that the film is stretched in the secondary-stretching process of the step (f), i.e., contracted in the machine direction (MD) in stretching of the machine direction (MD) and contracted in the transverse direction (TD) in stretching of the transverse direction (TD). When the film is contracted by below 20%, the remaining tension increases to cause the increase of the film shrinkage. When the film is contracted by below 35%, the pores inside the film are blocked to cause the rapid decrease of permeability.

The high heat-setting temperature is advantageous to reduce the shrinkage. However, when the heat-setting temperature is too high, the film is partially melted and the formed micropores are blocked to thereby deteriorate the permeability. The heat-setting temperature may be selected in the range of the temperature that 50 to 80 wt % of crystal portion of the first layer of the secondary-stretched film is melted. When the heat-setting temperature is selected in the range of the temperature lower than temperature that 50 wt % of the crystal portion of the film is melted, the remaining tension of the film is slightly removed. When the heat-setting temperature is selected in the range of the temperature higher than temperature that 80 wt % of the crystal portion of the film is melted, the micropores are blocked by partial melting to deteriorate permeability.

A heat-setting time should be relatively short when the heat-setting temperature is high, and the heat-setting time may be relatively long when the heat-setting temperature is low. The heat-setting time is preferably 20 seconds to 2 minutes. The heat-setting time is most preferably 1 minute in a temperature range that 70 wt % of crystal portion of the first layer is melted.

Advantageous Effects of Invention

The porous multi-layer film according to the present invention includes a first layer having porosity of 30 to 60% and an average pore diameter of 0.01 to 0.1 µm, and a second layer that has a porosity of 50 to 80% and an area ratio that pores having an average plane diameter of 0.1 to 50 µm occupy in the pore of the second layer is 70% or more. Accordingly, quality stability, permeability and an electrolyte retaining properties of the porous multi-layer film are improved.

The porous multi-layer film has a thickness of 9 to 50 µm, loop stiffness to the machine direction (MD) of 0.008 mg/µm or more, puncture strength of 0.15 N/µm or more, permeability of $1.5 \times 10^{-5}$ Darcy or more, shut-down temperature of 140° C. or less, melt fracture temperature of 170° C. or more, maximum shrinkage to the transverse direction (TD) of 25% or less and the melt down temperature (having a length of 120%) of 160° C. or more in TMA under the load of 1 mN/(1 µm×6 mm). Accordingly, the porous multi-layer film has superior thermal stability at high temperature and electrolyte retaining property due to a dual pore structure and is used as an excellent separator for high-capacity/high-power lithium ion battery.

BRIEF DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
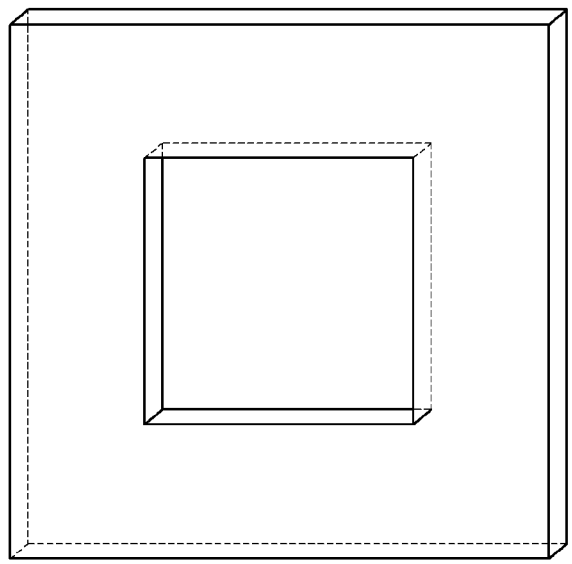
FIG. 1 shows a frame for measuring melt fracture temperature of a microporous film prepared according to an exemplary embodiment.

1: frame
2: microporous film
3: tape

BEST MODE FOR CARRYING OUT THE INVENTION

The present invention will be more easily understood by following examples hereinafter. The following examples are provided not to limit the scope of the right but to exemplify the invention.

Test Method

A molecular weight and a molecular weight distribution used of resins were measured by a high temperature Gel Permeation Chromatography (GPC) of Polymer Laboratories.

Viscosity of a diluent was measured by Cannon Automatic Viscometer Model CAV-4.

A method for fabricating a sheet and a film from raw material was as follows.

※ Method for Fabricating a Film

A resin of a first layer and a diluent were mixed in a twin-screw compounder having φ=46 mm. The mixing temperature was 180 to 240° C. The resin was fed into a main hoper and the diluent was fed into an extruder using a side feeder. The melt was fabricated to have a structure of necessary layers through a multi-layer T-die for preparing a three-layer sheet.

A composition of the second layer were mixed/extruded in a twin-screw compounder having f=15 mm. The mixing/extrusion temperature was 200 to 250° C. The composition was fed into an extruder after mixing. The melt was fabricated to have a structure of necessary layers through the multi-layer T-die for preparing a three-layer sheet.

In order to analyze a phenomenon that a crystal portion is melted depending on the temperature of the fabricated sheet, a Mettler Toledo DSC was used. The analysis conditions were as follows: sample weight, 5 mg; and scanning rate, 10° C./min.

A sheet was stretched by the sequential stretching method. The sheet is stretched in a transverse direction (TD) by a tenter-type stretching machine after being stretched in a machine direction (MD) by a roll-type stretching machine while changing a stretching ratio and stretching temperature.

The extraction of the diluent was performed by immersion using methylene chloride, having the extraction time of 5 minutes.

A transverse direction (TD) stretching/shrinking machine of a tenter type was used in the secondary-stretching and heat-setting.

The thickness of the respective film layers was measured using a Scanning Electron Microscope (SEM). After cooling the prepared film under liquid nitrogen for 20 seconds and suddenly breaking the film, the thickness of the prepared film was measured by observing the cross-section thereof.

An average pore size and porosity of each layer was measured by two methods. A pore size of the first layer was measured by a half-dry method based on ASTM F316-03 using a porometer of PMI Company by preparing single-layer films under the same condition. Porosity of the first layer was calculated based on the thickness of the film and the density of the used resin by cutting the film prepared under the same condition by 20 cm×20 cm and measuring its weight. Porosity of the second layer was calculated based on the density of the composition used in a second layer after calculating volume and weight of the second layer based on the measured thickness and density of the first layer after cutting the film by 20 cm×20 cm and measuring its volume (20 cm×20 cm×thickness) and weight. In the pores of the second layer, a volume ratio (Vr) that pores having an average diameter of 0.1 to 50 μm occupy in the entire pores of the second layer was calculated from the porosity (P2) of the second layer and a ratio (Vp) that pores having an average diameter of 0.1 to 50 μm occupy in the entire surface of the second layer as shown in Equation 1.

$$Vr = Vp/P2 \times 100 \quad \text{[Equation 1]}$$

In the second layer, a ratio that pores having an average diameter of 0.1 to 50 μm occupy in the entire surface of the second layer was measured from an electron micrograph of the film surface after peeling off the first and the second layers. In the prepared film, puncture strength, gas permeability and melt fracture temperature as the most physical properties of the microporous film were measured and Table 2 showed the measurement result.

※ Method for Measuring the Physical Property (1) The loop stiffness was measured by a loop stiffness measuring device of Toyoseiki Company. A sample had a size of 150 mm (length)×25 mm (width) and a press speed of 3.3 mm/sec.

(2) The puncture strength was measured from the force when a pin having a diameter of 1.0 mm pierces a film at a speed of 120 mm/min.

(3) The gas permeability was measured by a porometer (PMI Model CFP-1500-AEL). Generally, the gas permeability is represented by Gurley number, but Gurley number does not compensate for the effect of a film thickness so that it is difficult to know the relative permeability according to the pore structure of the film itself. In order to solve this problem, the present invention used Darcy's permeability constants. The Darcy's permeability constants were obtained from equation 1 below and nitrogen was used in the present invention.

$$C = (8F\,T\,V)/(\pi D^2(P^2-1)) \quad \text{[Equation 2]}$$

wherein C=Darcy permeability constant
F=Flow velocity
T=Sample thickness
V=Viscosity of gas (0.185 for $N_2$)
D=Sample diameter
P=Pressure In the present invention, an average value of Darcy's permeability constant in the range of 100 to 200 psi was used.

(4) A shut-down temperature was measured in a simple cell which measures impedance. In the simple cell, the microporous polyethylene composite film was interposed between two graphite electrodes, and electrolytes were injected. An electrical resistance was measured, while temperature was increased from 25 to 200° C. at a rate of 5° C./min by using an alternating current of 1 kHz. At this time, a temperature in which the electrical resistance was rapidly increased to a few hundreds to a few thousands Ω or more was selected as the shut-down temperature. The electrolyte in which 1M lithium hexafluorophosphate (LiPF$_6$) was dissolved in a solution that ethylene carbonate and propylene carbonate were mixed in a weight ratio of 1:1 was used.

Figure 2:
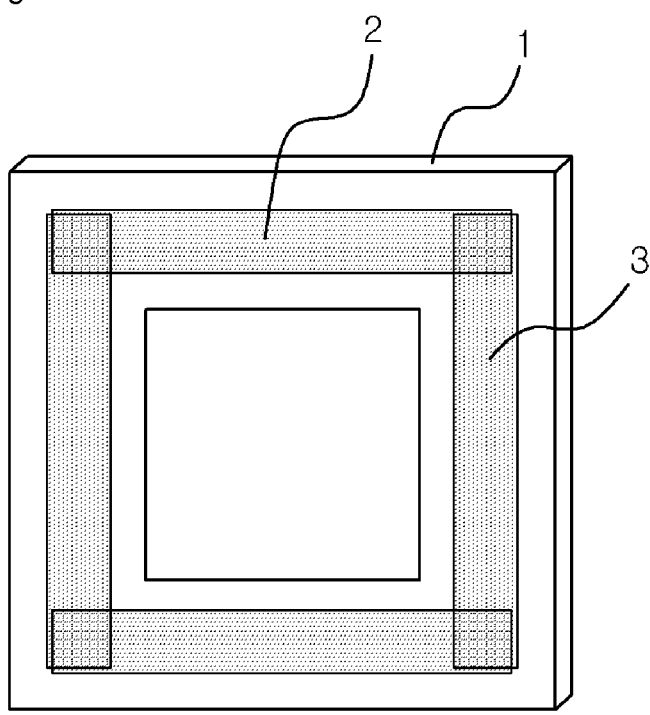
FIG. 2 shows a microporous film that is set to the frame for measuring melt fracture temperature of the microporous film prepared according to an exemplary embodiment by a tape.

(5) In order to measure the melt fracture temperature of the film 2, the film 2 (5 cm×5 cm) as shown in [FIG. 2] was set to the frame 1 (outer: 7.5 cm×7.5 cm, inner: 2.5 cm×2.5 cm) as shown in [FIG. 1] using a polyimide tape 3 and was put for 5 minutes in a convention oven that maintained a set temperature, and thereafter, it was observed whether the film 2 was fractured. A highest temperature that the film 2 was not fractured was defined as a melt fracture temperature.

(6) Transverse direction (TD) shrinkage and melt down temperature in TMA was measured by TMA/SDTA840 of Mettler Toledo Company.

A length change in a transverse direction (TD) was checked while increasing temperature from 30° C. to 200° C. at a speed of 5° C./min in a state that the external load of 1 mN/(1 μm×6 mm) was applied in a transverse direction (TD). A size of a sample was 15 mm in a transverse direction (TD) and 6 mm in a machine direction (MD). The shrinkage was that a rate of varying lengths with respect to the initial length was expressed as a percentage. While temperature increases, a film was shrunk at an early stage and extended again. The maximum shrinking level was a maximum shrinkage. The temperature, at which a length becomes 120% of the initial length, was melt down temperature.

Example 1

In the first layer, polyethylene having a weight average molecular weight of 3.0×10$^5$, and melting temperature of 134° C. and paraffin oil having kinetic viscosity of 95 cSt at 40° C. were used. Contents of the two elements were 30 wt % and 70 wt %, respectively. In the second layer, polymethylpentene of 50 volume % having a melt index of 9.0 (260° C., 5 Kg) as a high heat-resistant resin and polypropylene of 50 volume % having a weight average molecular weight of 5.7× 10$^5$ and melting temperature of 163° C. as other resins that were liquid-liquid phase separated from the high heat-resistant resin was used. CaCO$_3$ of 50 wt % having an average particle size of 1.5 μm was used as an inorganic material.

The sheet was stretched 8 times in a machine direction (MD) at 115° C. and 6 times in a transverse direction (TD) at 120° C. after co-extruding the first layers formed on both surfaces in three layers. The extraction of the diluent was performed in an immersion method using methylene chloride, having the extraction time of 5 minutes. Thereafter, secondary-stretching was performed 1.4 times in a transverse direction (TD) at 130° C. and heat-setting was performed in a transverse direction (TD) at 133° C. to shrink the film by 28.6%. A final film having a total thickness of 23 μm was formed of the first layers having a thickness of 8 μm in both surfaces and the second layer having a thickness of 7 μm as an intermediate layer.

Example 2

In the first layer, polyethylene having a weight average molecular weight of 3.0×10$^5$, and melting temperature of 134° C. and paraffin oil having kinetic viscosity of 95 cSt at 40° C. were used. Contents of the two elements were 30 wt % and 70 wt %, respectively. In the second layer, polymethylpentene of 50 volume % having a melt index of 9.0 (260° C., 5 Kg) as a high heat-resistant resin and polypropylene of 50 volume % having a weight average molecular weight of 2.5× 10$^5$ and melting temperature of 148° C. as other resins that were liquid-liquid phase separated from the high heat-resistant resin was used. CaCO$_3$ of 30 wt % having an average particle size of 1.5 μm was used as an inorganic material.

The sheet was stretched 7 times in a machine direction (MD) at 115° C. and 5 times in a transverse direction (TD) at 120° C. after co-extruding the first layers formed on both surfaces in three layers. The extraction of the diluent was performed in an immersion method using methylene chloride, having the extraction time of 5 minutes. Thereafter, secondary-stretch stretching was performed 1.3 times in a transverse direction (TD) at 130° C. and heat-setting was performed in a transverse direction (TD) at 133° C. to shrink the film by 30.8%. A final film having a total thickness of 21 μm was formed of the first layers having a thickness of 6 μm in both surfaces and the second layer having a thickness of 9 μm as an intermediate layer.

Example 3

In the first layer, polyethylene having a weight average molecular weight of 3.0×10$^5$, and melting temperature of 134° C. and paraffin oil having kinetic viscosity of 95 cSt at 40° C. were used. Contents of the two elements were 30 wt % and 70 wt %, respectively. In the second layer, polymethylpentene of 70 volume % having a melt index of 9.0 (260° C., 5 Kg) as a high heat-resistant resin and polyethylene of 30 volume % having a weight average molecular weight of 2.3× 10$^5$ and melting temperature of 133° C. as other resins that were liquid-liquid phase separated from the high heat-resistant resin was used.

The sheet was stretched 8 times in a machine direction (MD) at 115° C. and 5 times in a transverse direction (TD) at 120° C. after co-extruding the first layers formed on both surfaces in three layers. The extraction of the diluent was performed in an immersion method using methylene chloride, having the extraction time of 5 minutes. Thereafter, secondary-stretching was performed 1.3 times in a transverse direction (TD) at 130° C. and heat-setting was performed in a transverse direction (TD) at 133° C. to shrink the film by 23.1%. A final film having a total thickness of 16 μm was formed of the first layers having a thickness of 6 μm in both surfaces and the second layer having a thickness of 4 μm as an intermediate layer.

Example 4

In the first layer, polyethylene having a weight average molecular weight of 2.3×10$^5$, and melting temperature of 133° C. and paraffin oil having kinetic viscosity of 95 cSt at 40° C. were used. Contents of the two elements were 30 wt % and 70 wt %, respectively. In the second layer, polypropylene of 100 volume % having a weight average molecular weight of 5.7×10$^5$ and melting temperature of 163° C. as a general heat-resistant resin and CaCO$_3$ of 60 wt % having an average particle size of 0.8 μm was used.

The sheet was stretched 7 times in a machine direction (MD) at 115° C. and 5 times in a transverse direction (TD) at 120° C. after co-extruding the first layers formed on both surfaces in three layers. The extraction of the diluent was performed in an immersion method using methylene chloride, having the extraction time of 5 minutes. Thereafter, secondary-stretching was performed 1.5 times in a transverse direction (TD) at 130° C. and heat-setting was performed in a transverse direction (TD) at 133° C. to shrink the film by 33.3%. A final film having a total thickness of 23 μm was formed of the first layers having a thickness of 8 μm in both surfaces and the second layer having a thickness of 7 μm as an intermediate layer.

Example 5

In the first layer, polyethylene having a weight average molecular weight of $3.0 \times 10^5$, and melting temperature of 134° C. and paraffin oil having kinetic viscosity of 95 cSt at 40° C. were used. Contents of the two elements were 30 wt % and 70 wt %, respectively. In the second layer, polypropylene of 70 volume % having a weight average molecular weight of $5.7 \times 10^5$ and melting temperature of 163° C. as a general heat-resistant resin and polyvinyllidene fluoride of 30 volume % having melting temperature of 173° C. as other resins that were liquid-liquid phase separated from the general heat-resistant resin were used. $CaCO_3$ of 40 wt % having an average particle size of 0.8 μm was used as an inorganic material.

The sheet was stretched 7 times in a machine direction (MD) at 115° C. and 5 times in a transverse direction (TD) at 120° C. after co-extruding the first layers as an intermediate layer in three layers. The extraction of the diluent was performed in an immersion method using methylene chloride, having the extraction time of 5 minutes. Thereafter, secondary-stretching was performed 1.3 times in a transverse direction (TD) at 130° C. and heat-setting was performed in a transverse direction (TD) at 133° C. to shrink the film by 23.1%. A final film having a total thickness of 18 μm was formed of the first layers having a thickness of 10 μm as an intermediate layer and the second layer having a thickness of 4 μm in both surfaces.

Comparative Example 1

In the first layer, polyethylene having a weight average molecular weight of $3.0 \times 10^5$, and melting temperature of 134° C. and paraffin oil having kinetic viscosity of 95 cSt at 40° C. were used. Contents of the two elements were 35 wt % and 65 wt %, respectively.

A first layer sheet was stretched 7 times in a machine direction (MD) at 115° C. and 5 times in a transverse direction (TD) at 120° C. alone. The extraction of the diluent was performed in an immersion method using methylene chloride, having the extraction time of 5 minutes. Thereafter, secondary-stretching was performed 1.3 times in a transverse direction (TD) at 130° C. and heat-setting was performed in a transverse direction (TD) at 133° C. to shrink the film by 15.4%. A final film had a thickness of 20 μm.

Comparative Example 2

In the first layer, polyethylene having a weight average molecular weight of $3.0 \times 10^5$, and melting temperature of 134° C. and paraffin oil having kinetic viscosity of 95 cSt at 40° C. were used. Contents of the two elements were 30 wt % and 70 wt %, respectively. In the second layer, polypropylene of 100 volume % having a weight average molecular weight of $5.7 \times 10^5$ and melting temperature of 163° C. as a general heat-resistant resin and $CaCO_3$ of 20 wt % having an average particle size of 0.8 μm was used.

The sheet was stretched 6 times in a machine direction (MD) at 115° C. and 6 times in a transverse direction (TD) at 120° C. after co-extruding the first layers formed on both surfaces in three layers. The extraction of the diluent was performed in an immersion method using methylene chloride, having the extraction time of 5 minutes. Thereafter, secondary-stretching was performed 1.2 times in a transverse direction (TD) at 130° C. and heat-setting was performed in a transverse direction (TD) at 133° C. to shrink the film by 16.7%. A final film having a total thickness of 22 μm was formed of the first layers having a thickness of 8 μm in both surfaces and the second layer having a thickness of 6 μm as an intermediate layer.

Comparative Example 3

In the first layer, polyethylene having a weight average molecular weight of $1.8 \times 10^5$, and melting temperature of 135° C. and paraffin oil having kinetic viscosity of 95 cSt at 40° C. were used. Contents of the two elements were 30 wt % and 70 wt %, respectively. In the second layer, polymethylpentene of 30 volume % having a melt index of 9.0 (260° C., 5 Kg) as a high heat-resistant resin and polypropylene of 70 volume % having a weight average molecular weight of $5.7 \times 10^5$ and melting temperature of 163° C. as other resins that were liquid-liquid phase separated from the high heat-resistant resin was used. $CaCO_3$ of 70 wt % having an average particle size of 1.5 μm was used as an inorganic material.

The sheet was stretched 4 times in a machine direction (MD) at 115° C. and 6 times in a transverse direction (TD) at 120° C. after co-extruding the first layers formed on both surfaces in three layers. The extraction of the diluent was performed in an immersion method using methylene chloride, having the extraction time of 5 minutes. Thereafter, secondary-stretching was performed 1.5 times in a transverse direction (TD) at 130° C. and heat-setting was performed in a transverse direction (TD) at 133° C. to shrink the film by 33.3%. A final film having a total thickness of 22 μm was formed of the first layers having a thickness of 3 μm in both surfaces and the second layer having a thickness of 16 μm as an intermediate layer.

Comparative Example 4

In the first layer, polyethylene having a weight average molecular weight of $3.0 \times 10^5$, and melting temperature of 134° C. and paraffin oil having kinetic viscosity of 95 cSt at 40° C. were used. Contents of the two elements were 30 wt % and 70 wt %, respectively. In the second layer, polypropylene of 50 volume % having a weight average molecular weight of $5.7 \times 10^5$ and melting temperature of 163° C. as a general heat-resistant resin and polyethylene of 50 volume % having a weight average molecular weight of $2.3 \times 10^5$ and melting temperature of 133° C. as other resins that were liquid-liquid phase separated from the general heat-resistant resin were used.

The sheet was stretched 8 times in a machine direction (MD) at 115° C. and 6 times in a transverse direction (TD) at 120° C. after co-extruding the first layers formed on both surfaces in three layers. The extraction of the diluent was performed in an immersion method using methylene chloride, having the extraction time of 5 minutes. Thereafter, secondary-stretching was performed 1.4 times in a transverse direction (TD) at 130° C. and heat-setting was performed in a transverse direction (TD) at 135° C. to shrink the film by 35.7%. A final film having a total thickness of 20 μm was formed of the first layers having a thickness of 8 μm in both surfaces and the second layer having a thickness of 4 μm as an intermediate layer.

TABLE 1

|  |  | Example 1 | Example 2 | Example 3 | Example 4 | Example 5 |
|---|---|---|---|---|---|---|
| First layer | Resin(Tm, °C.) | PE(134° C.) | PE(134° C.) | PE(134° C.) | PE(133° C.) | PE(134° C.) |
| Second layer | High heat-resistant resin (volume %) | PMP(50) | PMP(50) | PMP(70) | — | — |
|  | General heat-resistant resin (volume %) | — | — | — | HPP(100) | HPP(70) |
|  | Other resin (volume %) | HPP(50) | RPP(50) | PE(30) | — | PVDF(30) |
|  | Inorganic layer(wt %) ※ | CaCO$_3$(50) | CaCO$_3$(30) | — | CaCO$_3$(60) | CaCO$_3$(40) |
| First stretching | Stretching ratio(MD × TD) | 8 × 6 | 7 × 5 | 8 × 5 | 7 × 5 | 7 × 5 |
|  | stretching temperature (° C.) MD | 115 | 115 | 115 | 115 | 115 |
|  | stretching temperature (° C.) TD | 120 | 120 | 120 | 120 | 120 |
| Second stretching | Stretching ratio | 1.4 | 1.3 | 1.3 | 1.5 | 1.7 |
|  | stretching temperature (° C.) | 130 | 130 | 130 | 130 | 130 |
| Heat setting | Shrinkage (%) | 28.6 | 30.8 | 23.1 | 33.3 | 35.0 |
|  | Heat-setting temperature (° C.) | 133 | 133 | 133 | 133 | 133 |

PE: Polyethylene,
HPP: Homo-polypropylene,
RPP; Random polypropylene,
PMP: Polymethylpentene,
PVDF; Polyvinylidene fluoride,
Other resin; High heat-resistant resin or Resin that is separated by liquid-liquid phase separation from a general heat-resistant resin
※ weight % of the entire composition in the second layer

TABLE 2

|  |  | Example 1 | Example 2 | Example 3 | Example 4 | Example 5 |
|---|---|---|---|---|---|---|
| First layer | Thickness (μm) | 8 | 6 | 6 | 8 | 10 |
|  | Porosity(%) | 45 | 38 | 42 | 40 | 40 |
|  | Average pore diameter(μm) | 0.046 | 0.035 | 0.041 | 0.039 | 0.04 |
| Second layer | Thickness(μm) | 7 | 9 | 4 | 7 | 4 |
|  | Porosity(%) | 75 | 72 | 65 | 77 | 70 |
|  | Pore ratio(%) of 0.1~50 μm | 70 | 75 | 77 | 72 | 70 |
| Loop stiffness (mg/μm) |  | 0.015 | 0.012 | 0.009 | 0.009 | 0.017 |
| Puncture strength(N/μm) |  | 0.26 | 0.24 | 0.28 | 0.20 | 0.24 |
| Permeability(×10$^{-5}$ Darcy) |  | 2.85 | 1.77 | 2.62 | 3.12 | 2.20 |
| Shutdown temperature(° C.) |  | 135 | 137 | 137 | 138 | 137 |
| Melt fracture temperature(° C.) |  | 200 | 203 | 210 | 170 | 175 |
| TMA | Maximum shrinkage (%) | 20 | 17 | 10 | 16 | 17 |
|  | Melt-down temperature (° C.) | 170 | 162 |  |  |  |

TABLE 3

|  |  | Comparative Example 1 | Comparative Example 2 | Comparative Example 3 | Comparative Example 4 |
|---|---|---|---|---|---|
| First layer | Resin (Tm, ° C.) | PE(134° C.) | PE(134° C.) | PE(135° C.) | PE(134° C.) |
| Second layer | High heat-resistant resin (volume %) | — | — | PMP(30) | — |
|  | General heat- | — | HPP | — | HPP(50) |

TABLE 3-continued

|  |  | Comparative Example 1 | Comparative Example 2 | Comparative Example 3 | Comparative Example 4 |
|---|---|---|---|---|---|
|  | resistant resin (volume %) |  |  |  |  |
|  | Other resin(volume %) | — | — | HPP(70) | PE(50) |
|  | Inorganic layer(wt %)※ | — | $CaCO_3$(20) | $CaCO_3$(70) | — |
| First stretching | Stretching ratio(MD × TD) | 7 × 5 | 6 × 6 | 4 × 6 | 8 × 6 |
|  | Stretching temperature (° C.) MD | 115 | 115 | 115 | 115 |
|  | Stretching temperature (° C.) TD | 120 | 120 | 120 | 120 |
| Second stretching | Stretching ratio | 1.3 | 1.2 | 1.5 | 1.4 |
|  | Stretching temperature (° C.) | 130 | 130 | 130 | 130 |
| Heat setting | Shrinkage(%) | 15.4 | 16.7 | 33.3 | 35.7 |
|  | Heat-setting temperature (° C.) | 133 | 133 | 133 | 135 |

PE: Polyethylene,
HPP: Homo-polypropylene,
TPP; Ter-polypropylene,
PMP: Poly-methylpentene,
Other resin; High heat-resistant resin or Resin that is separated by liquid-liquid phase separation from a general heat-resistant resin
※weight % of the entire composition in the second layer

TABLE 4

|  |  | Comparative Example 1 | Comparative Example 2 | Comparative Example 3 | Comparative Example 4 |
|---|---|---|---|---|---|
| First layer | Thickness (μm) | 20 | 8 | 3 | 8 |
|  | Porosity (%) | 42 | 40 | 35 | 45 |
|  | Average pore diameter (μm) | 0.042 | 0.036 | 0.029 | 0.040 |
| Second layer | Thickness (μm) | — | 6 | 16 | 4 |
|  | Porosity (%) | — | 45 | 81 | 70 |
|  | Pore ratio (%) of 0.1~50 μm | — | 83 | 65 | 72 |
| Loop stiffness (mg/μm) |  | 0.006 | 0.012 | 0.003 | 0.016 |
| Puncture strength(N/μm) |  | 0.26 | 0.27 | 0.05 | 0.30 |
| Permeability (×$10^{-5}$ Darcy) |  | 2.98 | 0.8 | 3.8 | 1.0 |
| Shutdown temperature (° C.) |  | 135 | 135 | 136 | 135 |
| Melt fracture temperature (° C.) |  | 145 | 170 | 172 | 165 |
| TMA | Maximum shrinkage (%) | 20 | 35 | 42 | 10 |
|  | Melt-down temperature (° C.) | 143 | 168 | 165 | 155 |

The invention claimed is:

1. A porous multi-layer film, comprising:

a first layer having a porosity of 30 to 60% and an average pore diameter of 0.01 to 0.1 μm and a second layer adjacent to the first layer, the second layer having a porosity of 50 to 80% and having pores with a pore average plane diameter of 0.1 to 50 μm of 70% or more on the basis of the area of the entire pores of the second layer, wherein the second layer has a thickness of 3 μm or more and occupies 30 to 70% of the entire thickness of the porous multi-layer film, and is prepared to contain a general heat-resistant resin of 50 volume % or more of a resin composition and contain inorganic materials of 30 to 60 wt % together, and the general heat-resistant resin has a melting temperature of 160 to 180° C.; and the porous multi-layer film has a thickness of 9 to 50 μm, a loop stiffness to the machine direction of 0.008 mg/μm or more, a puncture strength of 0.15 N/μm or more, a permeability of 1.5×$10^{-5}$ Darcy or more, a shut-down temperature of 140° C. or less, a melt fracture temperature of 170° C. or more, a maximum shrinkage to a transverse direction (TD) of 25% or less in Thermomechanical Analysis (TMA) under a load of 1 mN/(1 μm×6 mm), and a melt-down temperature (temperature that the length reaches 120%) of 160° C. or more in Thermomechanical Analysis (TMA) under a load of 1 mN/(1 μm×6 mm).

2. The porous multi-layer film of claim 1, wherein the first layer has a porosity of 40 to 55%, and an average pore diameter of 0.01 to 0.05 μm, and in the second layer, a porosity is 60 to 80% and an area ratio that pores having a pore average plane diameter of 1 to 50 μm occupy in the second layer pore is 70% or more, wherein the entire porous multi-layer film including the first layer and the second layer has a thickness of 12 to 35 μm, and a melt fracture temperature of 180° C. or more.

3. The porous multi-layer film of claim 1, which is formed of a two-layer porous film having the first layer and the second layer, or a three-layer porous film that the first layers are formed on both surfaces of the second layer, or a three-layer porous film that the second layers are formed on both surfaces of the first layer.

4. The porous multi-layer film of claim 2, which is formed of a two-layer porous film having the first layer and the second layer, or a three-layer porous film that the first layers are formed on both surfaces of the second layer, or a three-layer porous film that the second layers are formed on both surfaces of the first layer.

5. A porous multi-layer film, comprising:
a first layer having a porosity of 30 to 60% and an average pore diameter of 0.01 to 0.1 μm and a second layer adjacent to the first layer, the second layer having a porosity of 50 to 80% and having pores with a pore average plane diameter of 0.1 to 50 μm of 70% or more on the basis of the area of the entire pores of the second layer,
wherein the second layer has a thickness of 3 μm or more and occupies 30 to 70% of the entire thickness of the porous multi-layer film, and contains a high heat-resistant resin having a melting temperature of 180° C. or more of 50 volume % or more of a resin composition, and other resin of 15 to 50 volume % of the resin composition to be liquid-liquid phase separated from the high heat-resistant resin; and
the porous multi-layer film has a thickness of 9 to 50 μm, a loop stiffness to the machine direction of 0.008 mg/μm or more, a puncture strength of 0.15N/μm or more, a permeability of $1.5 \times 10^{-5}$ Darcy or more, a shut-down temperature of 140° C. or less, a melt fracture temperature of 170° C. or more, a maximum shrinkage to a transverse direction (TD) of 25% or less in Thermomechanical Analysis (TMA) under a load of 1 mN/(1×6 mm), and a melt-down temperature (temperature that the length reaches 120%) of 160° C. or more in Thermomechanical Analysis (TMA) under a load of 1 mN/(1 μm×6 mm).

6. The porous multi-layer film of claim 5, wherein the first layer has a porosity of 40 to 55%, and an average pore diameter of 0.01 to 0.05 μm, and in the second layer, a porosity is 60 to 80% and an area ratio that pores having a pore average plane diameter of 1 to 50 μm occupy in the second layer pore is 70% or more, wherein the entire porous multi-layer film including the first layer and the second layer has a thickness of 12 to 35 μm, and a melt fracture temperature of 180° C. or more.

7. The porous multi-layer film of claim 5, which is formed of a two-layer porous film having the first layer and the second layer, or a three-layer porous film that the first layers are formed on both surfaces of the second layer, or a three-layer porous film that the second layers are formed on both surfaces of the first layer.

8. The porous multi-layer film of claim 6, which is formed of a two-layer porous film having the first layer and the second layer, or a three-layer porous film that the first layers are formed on both surfaces of the second layer, or a three-layer porous film that the second layers are formed on both surfaces of the first layer.

* * * * *

UNITED STATES PATENT AND TRADEMARK OFFICE
CERTIFICATE OF CORRECTION

Page 1 of 1

PATENT NO.      : 8,920,913 B2
APPLICATION NO. : 13/574813
DATED           : December 30, 2014
INVENTOR(S)     : Jang-Weon Rhee et al.

It is certified that error appears in the above-identified patent and that said Letters Patent is hereby corrected as shown below:

On the title page, Item (30) Foreign Application Priority Data, Column 1, Line 1, delete "(KE)" and insert -- (KR) --

In the Claims

Column 22, Line 10, Claim 5, delete "(1×6" and insert -- (1µm×6 --

Signed and Sealed this
Twenty-first Day of April, 2015

Michelle K. Lee
*Director of the United States Patent and Trademark Office*